Feb. 16, 1960 C. C. CUTLER 2,925,529

NON-LINEAR TRANSMISSION CIRCUITS

Filed Nov. 4, 1952

INVENTOR
C. C. CUTLER
BY Hugh S. Wertz
ATTORNEY

United States Patent Office 2,925,529

Patented Feb. 16, 1960

2,925,529

NON-LINEAR TRANSMISSION CIRCUITS

Cassius C. Cutler, Gillette, N.J., assignor to Bell Telephone Laboratories, Incorporated, New York, N.Y., a corporation of New York Application November 4, 1952, Serial No. 318,684

9 Claims. (Cl. 315—39.3)

This invention relates to apparatus having transmission characteristics which are related to the signal amplitude level. Typical of such apparatus are expanders, compressors, slicers and limiters.

The term "expander" is generally used to characterize a circuit arrangement which accentuates differences in signal amplitude level. For example, input signals of low amplitude levels are amplified slightly or attenuated considerably while input signals of higher amplitude level are amplified more or attenuated less.

The term "compressor" is generally used to characterize a circuit arrangement which provides relatively large amplification or low attenuation to low level signals and relatively lower amplification or more attenuation to higher level signals.

The term "slicer" is generally used to characterize a circuit arrangement which provides an output of a relatively high fixed amplitude level whenever the input signal amplitude exceeds a predetermined threshold level, but an output of a relatively low fixed amplitude level whenever the input signal amplitude is below this threshold level.

The term "limiter" is used to characterize a circuit arrangement which has linear characteristics at relatively low amplitude levels but which becomes non-linear at higher amplitude levels whereby a relatively uniform output level then results.

Various circuit arrangements are known for achieving the various transmission characteristics described above at audio and the lower radio frequencies, but such arrangements generally are not adaptable for use at the higher radio frequencies such as, for example, at microwave frequencies. Although the principles of the present invention are also applicable to circuit arrangements for use at these lower frequencies, they are especially suitable to circuit arrangements for operation at the higher radio frequencies. In particular, the invention is applicable to circuit arrangements which utilize traveling wave tubes as amplifying elements. Accordingly, it will be convenient to describe the invention with specific reference to use at the higher radio frequencies at which traveling wave tubes are advantageously employed as amplifying elements.

It is in accordance with the invention to combine input signal energy transmitted through a plurality of parallel branch paths having different transmission characteristics to obtain the amplitude sensitive characteristic desired. In particular, it is desirable to utilize branch paths whose electrical length (i.e. phase shift therealong in radians) varies differently with changes in amplitude level. For example, to achieve the expansion characteristic of an expander, an input signal is supplied to two branch paths having identical low level but different overload transmission characteristics and there is derived as the output the difference in the transmission of these two branch paths. In this way, at low amplitude levels of the input signal, the signal energy transmitted through the two paths will be substantially equal and so will balance out in the output. However, at increasing signal amplitude levels where one of the two branch paths becomes overloaded, the signal energy transmitted through the two paths will differ both in magnitude and phase and an unbalance will result which will be available as the output. In one illustrative embodiment to be described, the first branch path includes, in turn, a first attenuation element and a first traveling wave tube amplifier, while the second branch path includes a second traveling wave tube amplifier followed by a second attenuation element. If the two attenuation elements and the two traveling wave tube amplifiers are substantially identical, the second amplifier will overload before the first amplifier because at each instant the amplitude of the signal applied as an input to this second amplifier will exceed the amplitude of the signal applied as an input to the first amplifier by the amount of attenuation introduced by the first attenuation element. Accordingly, the two branch paths will have different overload characteristics as is desired for operation in the way described for achieving the desired expansion characteristics.

Additionally, it can be seen that when the amplitude level of the input signal is increased sufficiently such that both amplifiers are overloaded, then further increases in the signal level will little affect the output level which will be determined solely by the overload characteristics of the two amplifiers and the loss introduced by the attenuation elements. This results in a slicer transmission characteristic.

Additionally, if, instead, the signal energy transmitted through the two paths is combined additively, and the sum of the energy of the two waves is utilized as the output, the circuit can be employed as a compressor.

Moreover, by suitably adjusting the overload characteristics of the two branch paths such that, even for low amplitude level input signals, one of the two branch paths is overloading sufficiently to provide a difference output whose level increases linearly with the amplitude level of the input signal until the second branch path similarly overloads, after which an unbalance output of relatively uniform level results, there becomes available a limiter.

Several other arrangements will be described for instrumenting the principles set forth above. In particular, there will be described a traveling wave tube whose signal transmission path comprises at least two branch paths whereby there can be effected in the one tube a transmission characteristic which is related non-linearly to the signal amplitude level. Moreover, in a preferred embodiment of such a tube, the electron stream serves as one branch path while the wave transmission circuit is the other branch path.

The invention will be better understood from the following more detailed description taken in conjunction with the accompanying drawings, in which.

Figure 1:
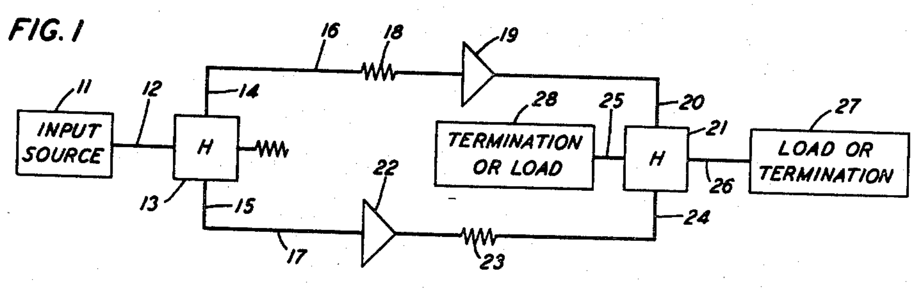
Fig. 1 shows schematically an illustrative transmission circuit in accordance with the invention which is adapted to have characteristics non-linearly related to the transmission level.

With reference now to the drawings, Fig. 1 shows schematically an illustrative circuit arrangement suitable for providing specific non-linear transmission characteristics to signals applied thereto, and especially adapted by way of example, for use at frequencies at which hollow wave guide transmission elements and traveling wave tube amplifiers are advantageously employed. The input electro-magnetic wave whose amplitude characteristics are to be modified in a prescribed manner is supplied from a suitable source 11 to an input arm 12 of a wave guide hybrid junction 13, of which the two conjugate output arms 14 and 15 form portions of branch paths 16 and 17, respectively. A suitable hybrid junction is disclosed in U.S. Patent 2,445,896 which was issued on July 27, 1948 to W. A. Tyrell. In this way, the wave energy applied to the junction is divided for transmission through the two branch paths 16 and 17. The branch path 16 comprises, in turn, an attenuation element 18 which, for example, is simply a dielectric element coated with lossy material suitably disposed in the wave guiding path, a traveling wave amplifier 19 and a first input arm 20 leading to a wave guide hybrid junction 21. The branch path 17 comprises a traveling wave amplifier 22 followed by an attenuation element 23, preferably similar to that in branch path 16, and a second input arm 24 to the hybrid junction 21. For expander, limiter or slicer applications, the sum arm 25 of the hybrid junction 21 is terminated in a reflectionless element represented by the block 28, while the difference arm 26 forms a wave guiding path leading to suitable utilization apparatus, or the load, shown as the block 27. For compressor applications, the sum arm 25 instead forms a wave guiding path leading to a load while the difference arm 26 is terminated in a reflectionless element.

In operation, wave energy is applied to the input arm of hybrid junction 13 where it divides for travel through the two branch paths 16 and 17 and the energy in these two branch paths is recombined in the hybrid junction 21.

It will be convenient first to describe this circuit for operation as an expander. For purposes of illustration, it will be convenient additionally to assume that there are employed substantially identical traveling wave amplifiers and attenuation elements in the two paths. As is now well known, the gain characteristics of traveling wave tubes can to a considerable extent be shaped by the distribution of loss inserted along the wave transmission circuit. For example, in my copending application Serial No. 168,202, filed June 15, 1950, there are described various possible distributions to effect desired characteristics. In particular the distribution can be such that the amplification factor is relatively constant over a range of input amplitude levels, but eventually falling off as the input amplitude level increases to the point where the tube is overloading. It can be seen that this is also the gain characteristic of the conventional thermionic vacuum tube. For expander operation each of the traveling wave tube amplifiers 19 and 22 preferably is chosen to have such a characteristic. However, it can be seen that because of the relative positioning of the attenuation elements 18 and 23 in the two branch paths the operating level of tube 19 will always be lower than that of tube 22 by an amount equal to the attenuation introduced by element 18. At sufficiently low levels of input signal, where despite the difference in operating levels the gain inserted by tube 22 is still substantially equal to the gain inserted by tube 19, the transmissions through the two branch paths will still be substantially equal and, accordingly, if the phase shifts introduced by the paths between the junctions 13 and 21 are also substantially equal, there will be substantially no wave energy delivered by the difference arm 26 of the junction 21 for utilization. However, as the amplitude level of the input wave increases, there will be reached a range of input amplitude levels where the difference in operating levels of the two tubes will result in an increasingly larger gain contribution by tube 19 which is continuously operating at a lower level. This occurs when tube 22 is operating at a level sufficiently high that it is overloaded and contributing little gain while tube 19 is operating at a level sufficiently low that it is not yet, or not as much, overloaded and, hence contributing more gain. Additionally, in this range of input amplitude levels the amount of phase shift introduced by the two tubes will vary because of the difference in overloading and so the waves in the two branch paths no longer are supplied in the same phase to the hybrid junction 21. It can be said that the electrical lengths of the two paths which were originally equal now differ because of the overloading of one. Both these factors provide an increasingly larger unbalance in the relative portions of signal energy transmitted through the two branch paths which provides a correspondingly larger differential output available for utilization at the difference arm 26 of the hybrid junction 21. As a result, in this range of input amplitude levels, the circuit arrangement shown acts as an expander. Moreover, by suitable adjusting of the gain characteristics of each amplifier and the amount of loss inserted by the attenuation elements, control of this range of amplitude levels can be effected.

Moreover, as the input amplitude level of source 11 increases beyond this range, there will be reached a point where the operating level of tube 19 is so high despite the insertion of attenuation element 18 that further increases do not result in an increased output being made available by the tube 19. At this point, tube 19 effectively acts as a limiter providing a substantially fixed output level which is approximately equal to the output level associated with tube 22. Under these circumstances, the amount of transmission through path 16 will exceed the amount of transmission through path 17 by the insertion loss introduced by attenuation element 23, in the branch path 17 following the tube 22. Then the differential output available for utilization at the difference arm 26 of the hybrid junction 21 will remain relatively fixed at a level determined by the amount of this loss and the relative phase shifts introduced by the two branch paths despite further increases in the amplitude level of source 11. Accordingly, in this range of input levels the circuit arrangement shown operates as a limiter.

It should be evident at this point that a considerable amount of latitude is possible in the choice of the characteristics which can be achieved and in the manner by which they are to be achieved. In particular, the level of operation is adjusted in accordance with whether the expander or limiter characteristics are to be utilized. In practice, it may be advantageous to utilize attenuation elements or amplifiers with dissimilar characteristics in the two paths. Moreover, it may be advantageous to utilize a combination of traveling wave tubes or attenuation elements or both in each path, provided the transmissions of the two paths are made to cancel for signals of amplitude levels sought to be de-emphasized and made to combine cumulatively for signals of amplitude levels sought to be emphasized. Additionally, it is possible to utilize several pairs of branch paths in accordance with the same general principles. Moreover, if the various operating characteristics are adjusted so that the transition region of amplitude levels in which only one of the two tubes is overloaded is narrow there can be achieved a slicer characteristic.

Moreover, as has been mentioned above, the basic arrangement shown in Fig. 1 can instead be employed as a compressor merely by utilizing the wave energy available at the sum arm 25 of the hybrid junction 21 and terminating the difference arm 26 in a reflectionless dissipative element. In this case, at low amplitude levels of input signals, at which the phase shift introduced by each of the two branch paths is substantially the same, the signal energy in the two paths will combine additively in the sum arm 25 to provide high gain, while at the levels where one tube is overloading, the signal energy in the separate paths tends to differ in phase at the junction 21 so that they no longer combine additively in the sum arm 25. In this application, it is advantageous to adjust the operating levels so that one tube starts to overload relatively soon after the amplitude level increases. Again, considerable latitude exists in the particular operating characteristics possible to achieve the desired effect.

Figure 2:
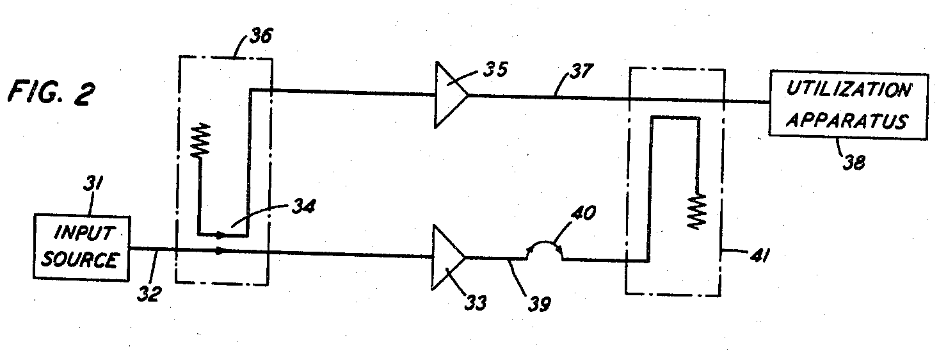
Fig. 2 illustrates one of the possible modifications of the circuit shown in Fig. 1 which utilizes directional coupling between branch paths.

Fig. 2 shows by way of example one possible modification of the basic arrangement shown in Fig. 1 which utilizes directional couplers for achieving distinctive transmission characteristics in different branch paths. By this expedient, increases in operating efficiency can be achieved. Input waves from a suitable source 31 are applied to a wave guide path 32 for propagation to a traveling wave tube amplifier 33. Additionally, directionally coupled to the wave guide path 32 is a wave guide path 34 which leads to a traveling wave tube amplifier 35. Directional coupling between the wave guide paths 32 and 34 can be achieved by including each as a component in a directional coupler 36. Various forms of directional couplers are known suitable for use here. Typical directional wave guide couplers suitable for use are described in an article entitled "Directive Couplers in Wave Guides," by M. Surdin, published on pages 775 through 786 of the Journal of the Institute of Electrical Engineers, volume 93, pt. IIIA, 1946. The output of tube 35 is thereafter supplied by way of wave guide path 37, a portion of which forms part of a directive coupler 41, to suitable utilization means 38. The output of tube 33 is supplied to the wave guide path 39 which for expander applications is rotated axially a half turn (shown schematically as the twist 40) which introduces a phase shift of $\pi$ radians and then forms part of the directional coupler 41. The directional coupler 36 is preferably adjusted to transfer a major portion of the input wave energy by way of the wave guide path 34 to the tube 35 so that tube 35 is always operating at a higher amplitude level than tube 33. The tubes 33 and 35 preferably are identical, each having a level-gain characteristic which is relatively constant at low signal levels but which falls off at higher signal levels, as described for tubes 19 and 22 in the arrangement shown in Fig. 1. Additionally, directional coupler 41 is adjusted so that a major portion of the energy in path 37 is supplied to path 39 for absorption in the termination associated therewith as part of directional coupler 41 while the major portion of the energy in path 39 is supplied to path 37 for transmission to the utilization means 38. As a result, there is provided a transmission circuit quite similar to that described for the arrangement shown in Fig. 1 for operation as an expander. For example, suppose that each of the directional couplers 36 and 41 is adjusted so that two thirds of the energy propagating in each path of the coupler is transferred to the other path, while one third of the energy is retained to be combined with the energy transferred thereto from the other path. Then two thirds of the energy supplied by the source 31 will be applied to tube 35 and one third to tube 33. Thereafter, one third of the energy in wave path 37 will be combined with two thirds of the energy in wave path 40 for transmission to the utilization means 38. If the difference in the phase shifts introduced along the two branch paths between directional couplers 36 and 41 is only the $\pi$ radians introduced by twist 40 and if the gain introduced by each tube is equal, then there will be substantially no wave energy supplied to the utilization means 38, while if this phase difference is other than $\pi$ radians or the gain introduced by each tube is unequal, an unbalance output will be supplied to the utilization means 38. Accordingly, the characteristics of this arrangement are similar to those described for the arrangement shown in Fig. 1. The apportionment of different portions of the signal wave energy to the two branch paths by means of the directional couplers can be viewed as the insertion of different attenuation in the two paths. In operation, as the amplitude level of the energy supplied by the source 31 increases, tube 35 tends to overload sooner than tube 33 and an unbalance output results which grows as the amplitude level of the input increases. Moreover, at sufficiently high amplitude levels this arrangement also acts as a limiter. As in the earlier described arrangement, considerable flexibility is possible in achieving the desired characteristics.

Furthermore, the arrangement described above can be utilized as a compressor merely by omitting the twist 40 or the $\pi$ radians extra shift in wave path 39 whereby at low input levels the energy supplied by the wave path 39 to the wave path 37 will be in phase with the energy retained by wave path 37 while at increasing levels a phase difference exists which results in increasing cancellation between the waves in the two paths.

Figure 3:
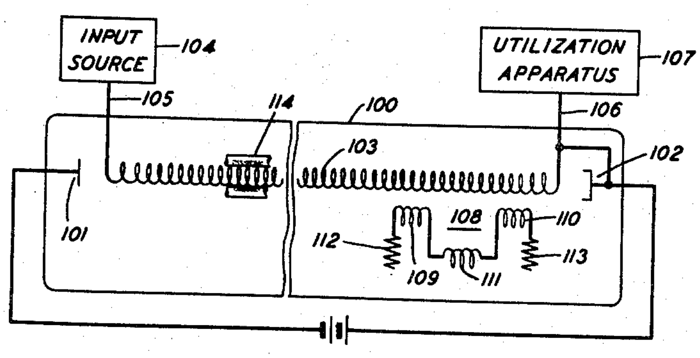
Fig. 3 shows schematically a traveling wave tube whose wave transmission circuit includes two parallel circuit paths for providing non-linear gain characteristics in accordance with the invention.

In an important aspect of the invention, the various principles described above are employed in providing a traveling wave tube whose wave transmission circuit comprises a plurality of branch paths whereby desired non-linear transmission characteristics can be readily achieved. Fig. 3 shows schematically a traveling wave tube of this kind. At opposite ends of an evacuated envelope 100 which can, for example, be of glass, an electron source 101, such as an electron gun, and target electrode 102 define therebetween a longitudinal path of electron flow. Positioned parallel to this path and in field coupling relation with the electron flow is a main wave transmission circuit, shown here as a helical conductor 103 preferably more than ten wavelengths long. Input waves from a suitable source 104 are applied by a suitable coupling connection 105 to the upstream end of the helix 103, and output waves are abstracted at the downstream end of the helix 103 by a suitable coupling connection 106 for use by utilization apparatus 107. Along the helix 103, there is inserted a loss region 114 to minimize oscillations resulting from reflections at the output end of the circuit. Up to this point, there has been described a typical helix-type traveling wave tube. In operation, the electrons are made to travel along their path of flow at a velocity approximating that of the axial velocity of the wave traveling along the helix 103. At the upstream end of the path of flow, the electrons are bunched by interaction with the input wave and these electron bunches thereafter contribute energy to the helix circuit whereby the input wave traveling along the helix circuit is amplified. However, for the practice of the invention, there is additionally included preferably wholly within the envelope 100 an auxiliary wave transmission circuit 108. The main and auxiliary wave circuits are arranged to form branch wave guiding paths for the traveling wave being amplified. To this end, the auxiliary circuit 108 comprises first and second sections of helical conductor 109 and 110, respectively, each preferably several wavelengths long and disposed in energy exchange relation with the helix circuit 103 beyond the region 114 of loss insertion and at the high level end of the main circuit 103. Helix sections 109 and 110 are linked together by a helix section 111 not in energy exchange relation with the helix circuit 103. To effect the energy transfer between the helix sections 109 and 110 of the auxiliary circuit 108 and the helix 103 which forms the main circuit, these several helices are preferably, similarly dimensioned in pitch and diameter so that the axial wave or phase velocities therealong are equal. The helices 109 and 110 are properly spaced and unshielded from the helix 103 to be coupled electromagnetically therewith for a suitable distance to effect a desired degree of energy transfer therebetween. Preferably, the several helices are so terminated that waves transferred from one helix to another travel in the last helix in the same direction as the waves in the first helix with negligible backward wave transmission. The backward wave transmission can be made negligible by providing high attenuation at the free ends of helices 109 and 110, as for example by coating these ends with lossy material. This has been shown schematically in Fig. 3 by terminating the free ends of helices 109 and 110 in impedances 112 and 113, respectively. It should be evident that effectively helices 109 and 110 form directional couplers with the main wave circuit 103. The intermediate helix section 111 is maintained uncoupled to the helix 103 by being sufficiently displaced therefrom.

In operation, signal energy propagating along the main circuit 103 is abstracted therefrom by the helix 109 for travel along the auxiliary circuit 108 to the helix 110 from which it is transferred back to the main circuit 103. For expander application, the parameters of the auxiliary circuit 108 are adjusted so that at a low level of input signal that portion of the wave energy abstracted from the helix 103 by the helix 109 is reinserted therein by the helix 110 in a phase opposite to that of the portion of the signal energy which has not been abstracted from the main circuit 103 by the helix 109 but which has instead traveled continuously along the main circuit 103. Under such circumstances some cancellation results, and the output level is reduced. However, in a manner analogous to that which occurs in the cases described above, at increasing levels of input signals, the tube overloads and the phase shift introduced in the signal energy traveling continuously along the circuit 103 between the sections coupled, respectively, to the helices 109 and 110, will vary differently from the phase shift given to the signal energy shunted by the auxiliary circuit 108 between helices 109 and 110. That is to say, the electrical lengths of the main and auxiliary paths will vary differently as the signal level is increased. Accordingly, the phase of the signal energy being reinserted into the main circuit 103 by the helix 110 will tend no longer to be exactly opposite to that of the signal energy propagating continuously along the main circuit and less cancellation results. As a consequence, the output level is increased in a manner typical of the desired expansion characteristic. Since it is important to be operating in a region where the phase shift of the traveling wave is especially sensitive to amplitude level changes, it is advantageous to couple the auxiliary circuit 109 to the main circuit 103 downstream along a region of high level, and preferably downstream beyond the region of loss insertion 114. The terms "upstream" and "downstream" will be used both in the specification and in the claims to designate relative separation from the electron source. Accordingly, the term "upstream" will designate relative proximity to the electron source while the term "downstream" will designate relative remoteness from the electron source.

It should be evident that a tube of the kind just described can be utilized for effecting various other desirable non-linear characteristics merely by adjusting the lengths of the sections of the auxiliary circuit 108 relative to the length of the corresponding portion of the main circuit so that particular reinsertion relationships exist for desired operating levels of input signals.

The tube just described has utilized two separate wave transmission circuits, each of which comprises a structural wave guiding element. It is to be noted, however, that the electron beam does, in fact, form an electronic wave circuit along which propagates signal information in the form of density and velocity modulations on the electron beam, such modulations often being termed space charge waves. It is in accordance with one important aspect of the invention to employ in a traveling wave tube the electron beam as one branch path in combination with a physical wave circuit as the other branch path, to obtain desired non-linear transmission characteristics in a manner consistent with the principles set forth above.

Figure 4:
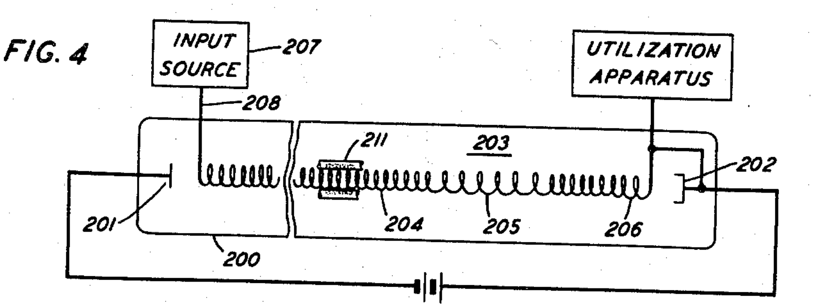
Fig. 4 shows schematically a traveling wave tube which utilizes the electron stream as one branch path in accordance with the principles of the invention.

Fig. 4 shows a traveling wave tube adapted for operation in this way. Within an envelope 200 which can, for example, be glass, an electron source 201 at one end and a target electrode 202 at the opposite end define therebetween a path of electron flow. Along this path of flow is a multisection wave transmission circuit, shown as the helical conductor 203. The conductor 203 is a multipitch helix, having a first relatively long interaction section 204, preferably more than ten wavelengths, of a uniform pitch adjusted to provide an axial wave velocity sufficiently equal to that of the electron stream therealong that cumulative interaction results between the stream and a wave traveling therealong, a second relatively shorter section 205, preferably less than three wavelengths, of a pitch adjusted to provide an axial wave velocity sufficiently different from that of the electron stream therealong that substantially no cumulative interaction results between the stream and a wave traveling therealong, and a third relatively shorter section 206 preferably less than three wavelengths of a uniform pitch substantially similar to that of the first section 204 to provide an axial wave velocity suitable for wave interaction with the electron stream. Accordingly, the multipitch helix 203 can be described as a multisection circuit having a first relatively long section 204 highly coupled to the electron stream, a relatively shorter intermediate section 205 negligibly coupled to the electron stream, and a relatively short final section 206 again highly coupled to the electron stream. The helix 203 also can be provided with tapered sections at the input and output ends for impedance matching purposes if desired, without affecting to any considerable extent the operation of the tube in the manner to be described. Input waves are applied to the electron source end of the wave circuit 203 from an input source 207 by a suitable coupling connection 208 and output waves are abstracted by way of a coupling connection 209 at the target end of the circuit 203 for transmission to utilization apparatus 210. A lossy section 211 is inserted along the first section 204 of the circuit to suppress any tendency to oscillations.

In operation, an input wave applied by way of coupling connection 208 to the wave circuit 203 is amplified in its travel along section 204 and the electron stream density and velocity are correspondingly modulated. Then, along section 205 where no cumulative interaction takes place between the traveling wave and the electron stream, the wave and stream travel substantially independent of one another. The wave will probably be slightly attenuated, and the electron stream modulation changed a bit but each will still have appreciable amplitude at the point where helix section 206 begins. Along section 206 the traveling wave and the electron stream will again interact cumulatively. For expander characteristics, it is desirable that for low levels of input signal the phase shifts undergone by the signal wave traveling along intermediate section 205 and that of the signal modulations on the electron beam in its travel past this intermediate section 205 are such that along the output section 206 the electrons in the beam encounter phase conditions of the interacting wave that result in demodulation of the stream and attenuation of the traveling signal wave on the helix, while for increasing levels at which overloading starts to affect the traveling signal wave's phase velocity along the circuit, the relative phase conditions of the traveling signal wave and the electron stream signal modulations are there such as to result in amplification of the traveling signal wave. For the various other non-linear characteristics desired, the operation is modified in accordance with the principles previously discussed.

It can be seen that effectively there are provided two transmission paths for the signal energy whose transmission characteristics, particularly the electrical length, will vary differently as the signal level increases. The desired phase relationships at the point where the signal energy of the two paths is combined can be achieved by proper adjustment of the length of the wave path of the intermediate section 205 relative to the velocity of the electron stream. Signal cancellation arrangements of this kind to secure desired non-linear transmission characteristics resemble the noise cancellation arrangements described in copending application Serial No. 220,416, filed April 11, 1951, by C. F. Quate, now United States Patent 2,908,844, issued October 13, 1959. In that application, various arrangements are described for decoupling the traveling wave from the electron stream for a desired interval. For example, it is shown that decoupling can be achieved by displacing a section of the wave circuit relative to the electron path to inhibit interaction with the electron stream, by varying the velocity of the electron stream past a section of the wave circuit, or by loading with dielectric a section of the wave circuit to vary the wave phase velocity therealong to inhibit cumulative interaction with the electron stream. These various expedients can all be here employed too. Moreover, it should be evident that these principles can be achieved with various forms of wave transmission circuits.

Accordingly, it is to be understood that the various arrangements described above are merely illustrative of the general principles of the invention. Various other arrangements can be devised by one skilled in the art without departing from the spirit and scope of the invention.

What is claimed is:

1. In combination, an electronic device comprising means forming an electron stream, first means disposed along said stream for forming a first continuous wave guiding path in energy transfer relationship with said stream and second means disposed along said stream for forming a second wave guiding signal path including first and second spaced sections in energy transfer relationship with the first wave guiding signal path and an intermediate section decoupled from said first wave-guiding signal path.

2. In combination, an electron source and a collector electrode defining therebetween a path of electron flow, a first continuous wave transmission circuit disposed along said path for propagating electromagnetic waves in coupling relation with the electron flow, and a second wave transmission circuit disposed along said path for abstracting energy from a predetermined point along said first circuit and for reinsertion at a point downstream of said predetermined point along said first circuit.

3. An electronic device comprising an electron source and a target electrode defining therebetween a path of electron flow, means along said path for forming a continuous main wave guiding path for propagating electromagnetic waves in interacting relationship with the electron flow, and means along said path for forming an auxiliary wave guiding path for transferring wave energy from a predetermined point along said main path to a point downstream of said predetermined point along said main path.

4. An electronic device comprising an electron source and target electrode for defining therebetween a path of electron flow, means to be supplied with signal waves along said path for forming a main wave guiding path for propagating the signal waves in interacting relation with the electron flow, and means along said path for forming a second wave guiding path for signal waves between two points spaced apart along said main path characterized by an electric length therealong between said two points which varies differently with changes in signal level than does the electrical length between the two points along the main wave guiding path.

5. An electronic device comprising an evacuated envelope, an electron source and a target electrode at opposite ends of said envelope for defining therebetween a path of electron flow, a first means wholly enclosed by said envelope defining an input signal continuous wave guiding path in energy transfer relationship with the electron flow, and second means wholly enclosed by said envelope including first and second members spaced apart along said path of electron flow, each in energy transfer relation with the first means, said first and second members being connected by a wave guiding path wholly enclosed by said envelope but in decoupled energy transfer relationship with said first means.

6. An electron device comprising an electron source and a target electrode defining therebetween a path of electron flow, a first wave transmission circuit positioned along said path for propagating electromagnetic waves in interacting relationship with the electron flow, input coupling means at one end of said wave circuit to be supplied with input signals, output coupling means at the opposite end of said wave circuit for abstracting output energy for utilization, a second wave circuit including a first section for abstracting signal energy from said first circuit at a predetermined location along said path of electron flow and a second section for returning signal energy to said first circuit downstream of said predetermined location along said path of electron flow, and terminating means at each end of said second circuit for making it substantially reflectionless.

7. An electronic device comprising an evacuated envelope, an electron source and a target electrode at opposite ends of the envelope for defining a path of electron flow, first means enclosed by the envelope defining a first wave guiding path in energy transfer relationship with electron flow, second means enclosed by the envelope including first and second members spaced apart along said stream and each in energy transfer relationship with the first means, and means connecting said first and second members for forming a wave guiding path therebetween in decoupled energy transfer relationship with said first means, and termination means enclosed by said envelope for making the two ends of said second means substantially reflectionless.

8. An electronic device comprising an electron source and a target electrode for defining therebetween a path of electron flow; a first helical conductor defining a continuous wave guiding path in energy transfer relationship with the electron flow along an extended portion of its path; and an auxiliary wave guiding path including two helical conductive members spaced apart along said path of electron flow, each in energy transfer relation with the first helical conductor, and a third conductive member forming a wave guiding path between said two helical conductive members, said third conductive member being out of energy transfer relationship with said first helical conductor.

9. In a device which utilizes the interaction between an electron stream and a propagating electromagnetic wave, an electron source and a collector electrode defining therebetween an electron stream having a predetermined average velocity, means comprising a substantially uniformly dimensioned helix extending along the major portion of the path of flow and forming a wave guiding path having a substantially uniform phase characteristic along its length and adapted to propagate an electromagnetic wave at a phase velocity in the direction of the electron stream substantially equal to said predetermined stream velocity, means adjacent said stream for altering the amount of energy propagating along said wave guiding path, said means comprising a second helical conductor having first and second sections spaced apart along the path of electron flow each in energy transfer relation with the second wave guiding path, and a third section joining said first and second sections and out of energy transfer relationship with said wave guiding section.

References Cited in the file of this patent

UNITED STATES PATENTS

| | | |
|---|---|---|
| 1,705,993 | Oswald | Mar. 19, 1929 |
| 1,859,565 | Keith | May 24, 1932 |
| 2,064,469 | Haeff | Dec. 15, 1936 |
| 2,210,028 | Doherty | Aug. 6, 1940 |

(Other references on following page)

UNITED STATES PATENTS

| | | |
|---|---|---|
| 2,489,082 | De Forest | Nov. 22, 1946 |
| 2,560,806 | Lewis | July 17, 1951 |
| 2,561,212 | Lewis | July 17, 1951 |
| 2,584,308 | Tiley | Feb. 5, 1952 |
| 2,588,831 | Hansell | Mar. 11, 1952 |
| 2,593,113 | Cutler | Apr. 15, 1952 |
| 2,595,698 | Peter | May 6, 1952 |
| 2,611,832 | Lopostolle | Sept. 23, 1952 |
| 2,616,990 | Knol | Nov. 4, 1952 |
| 2,653,270 | Kompfner | Sept. 22, 1953 |
| 2,657,314 | Kleen et al. | Oct. 27, 1953 |
| 2,767,259 | Peter | Oct. 16, 1956 |
| 2,821,652 | Robertson et al. | Jan. 28, 1958 |